Patented May 14, 1929.

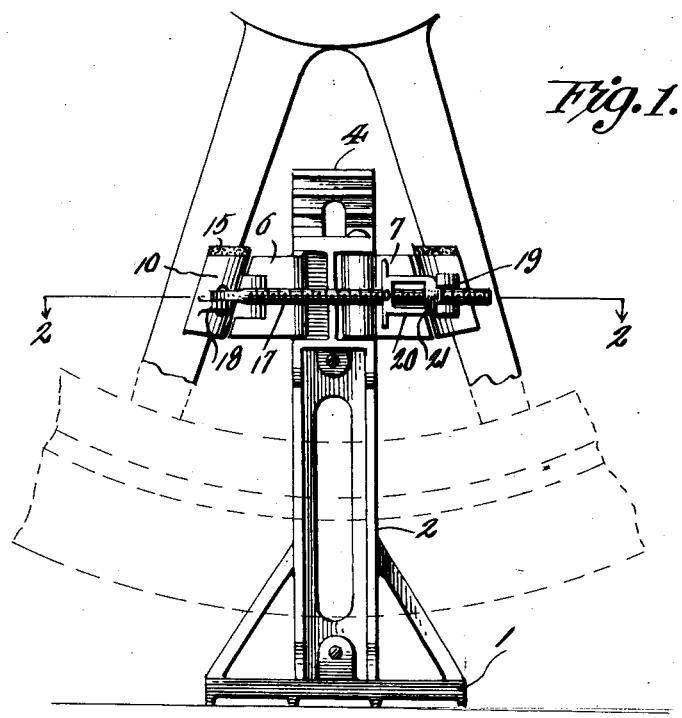
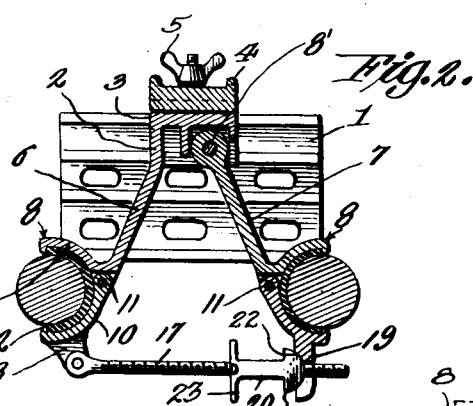
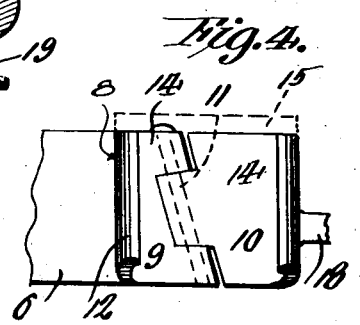
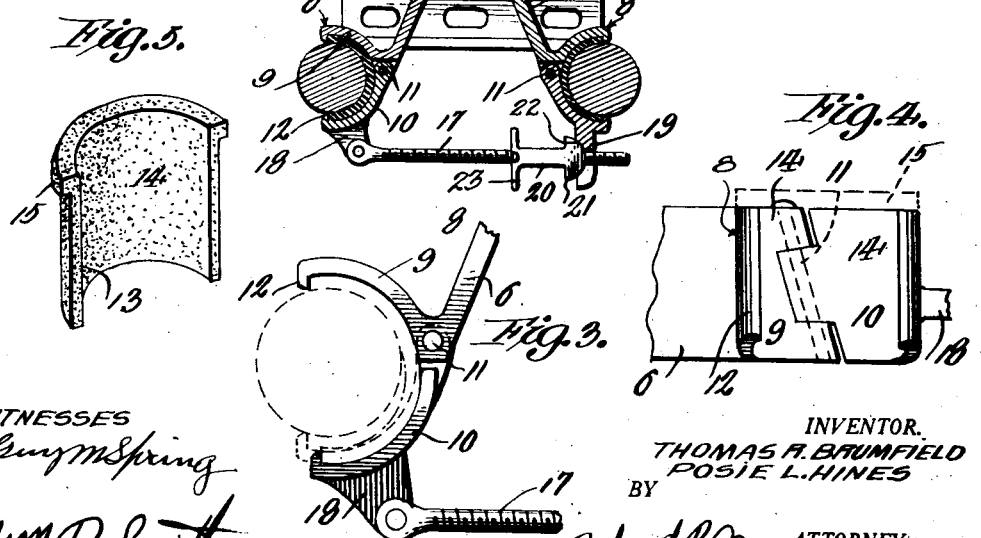

1,713,465

UNITED STATES PATENT OFFICE.

THOMAS R. BRUMFIELD AND POSIE L. HINES, OF DANVILLE, VIRGINIA; SAID BRUM-FIELD ASSIGNOR TO SAID HINES.

AUTOMOBILE JACK.

Application filed May 10, 1927. Serial No. 190,294.

This invention relates to a jack structure and has for its primary object a construction whereby the automobile may use its own motor power to raise that portion of the automobile to which the jack is applied.

An object of the invention is to so design and associate the various parts of the jack structure that a more effective grip may be accomplished between the jack structure and the spokes of a wheel irrespective of the size or the configuration of the latter.

Another object of the invention is to simplify the construction of the parts to materially reduce the cost of manufacture as well as the cost of assembling.

A feature of the invention is the utilization of a stationary arm and a movable arm as component parts of the clamp structure so that relative adjustment may be more readily accomplished to provide a more effective grip between the clamp structure and the object to be clamped.

A feature of the invention is the simplified construction of an expander whereby excessive power may be created between the two jaws to increase the effective engagement thereof.

With these and other objects in view, our invention will be better understood from the following detail description taken in connection with the accompanying drawings, wherein:—

Figure 1 is a front elevation of the jack in applied position,

Figure 2 is a horizontal sectional view on line 2—2 of Figure 1,

Figure 3 is a detail view of one of the clamp devices,

Figure 4 is a detail view looking at right angles to Figure 3,

Figure 5 is a perpsective view of the liners.

Again referring to the drawing illustrating one of the many constructions of our invention, the numeral 1 designates the base which may be of any suitable configuration or construction for effectively supporting the upright or standard 2. Associated with the standard 2 is a rack bar 3, one of a pair of companion rack bars utilized for supporting the vehicle independent of the clamping structure described and more particularly set forth in our copending application filed February 5, 1927, Serial Number 166,233.

The rack bar 4, herein known as the movable rack bar is positioned in a cooperative arrangement with the rack bar 3 hereinafter known as the stationary rack bar and these rack bars are effectively secured in adjusted position by the clamping device 5. As these parts of the invention do not enter into the present invention and are more fully set forth and claimed in the mentioned copending application further detail description thereof will be eliminated.

Our improved clamp structure whereby the jack may be effectively secured to various types of wheels having spokes of various size and configuration consists of a stationary arm 6 projecting laterally from the stationary rack bar and formed integral therewith. The movable arm 7 swings in a horizontal plane and to accommodate such movement a vertically extending pivot pin 8' is mounted in the stationary rack bar for supporting the associated end of the arm 7. Each of the arms have associated with the outer or free ends a novel construction of clamp device 8, consisting of a stationary jaw 9 and a movable jaw 10 that is pivotally connected to the stationary jaw as indicated at 11. It will be noted that each of these jaws are provided with a rib 12 coacting with the marginal edges 13 of the liners 14. Each liner is provided with a retaining flange 15 for engagement over the upper surfaces of the associated jaws. Thus it will be appreciated that the liners are effectively secured in place and as they are made from flexible material, preferably leather, they may readily contract or expand to conform to the surfaces engaged thereby. Referring to Figure 4 it will be noted that the stationary jaw and movable jaw has its pivotal connection 11 extending at an angle to the vertical so that in the swinging movement of the movable jaw the inner walls 14 of the jaws will travel away and toward each other in a converging relation so as to forcibly contract the liners around the formation of the wheel spokes.

At this point we wish to point out that the construction and formation of the various parts heretofore described is such that the casting thereof is facilitated to reduce production cost and to expedite assembling of the parts.

Any suitable device or structure may be utilized for forcibly swinging the jaws toward and away from each other and to swing the movable jaws into gripping position but for the purpose of illustration we have shown a simplified construction of the device consisting of a threaded rod 17 having one end pivotally connected to an ear 18 projecting from one of the movable jaws and its other end slidably mounted in a slotted bearing lug 19 carried by the other movable jaw. A nut 20 is threaded on the rod and is provided with a spherical head 21 engaging in a correspondingly shaped seat 22 in the bearing 19. An operating head 23 carried by the end of the nut opposite to the head 21 facilitates the threading of the nut along the threaded rod to exert pressure against the bearing 19 to forcibly spread the arms apart and the clamping devices into tight clamping engagement with the spokes associated therewith.

From the foregoing description taken in connection with the accompanying drawing it will be appreciated that we have designed a very substantial construction of a jack which is capable of two major operations, one accomplishing a tight clamping engagement with the spokes of a wheel for effectively securing the jack structure to a movable portion of the vehicle and the other operating to engage the axle of the vehicle after the clamp structure has performed its function, it being noted that the standard 4 can be adjusted and held in engagement with the axle of the vehicle, after which the clamp 8 can be released to allow the removal of the wheel or the like. As clearly set forth in our copending application one of the many advantages of our improved construction is the utilization of the motor power of the vehicle as the prime mover for lifting that portion of the vehicle to which the jack is attached and as there is considerable strain in the adjustment of the jack we have designed the improved clamping structure set forth in the present application consisting of parts so designed and connected that the arms may have a relative adjustment for initial movement into engagement with the spokes and providing companion clamp structures independently operated for increasing the effective engagement between the jaw structures and the wheel irrespective of the size or configuration of the spokes of the latter.

It is of course to be understood that the component parts of the jack structure may be designed and connected together in various other manners than illustrated and various other types of supports may be used with our improved clamp devices and we therefore do not desire to be limited in any manner except as set forth in the following claims.

What we claim as new is:

1. A jack structure comprising a base, a stationary rack bar projecting upwardly from the base, a movable rack bar adjustably associated with the stationary rack bar, a pair of clamps connected to one of the rack bars for relative movement, each clamp consisting of a stationary jaw and an associated movable jaw, and means for releasably holding the clamps and the movable jaw in adjusted position.

2. A jack structure comprising a support, a pair of clamps carried by the support for movement with respect to each other, each clamp including a stationary jaw and a movable jaw associated therewith, and means for releasably securing the clamps and the movable jaws in adjusted position.

3. A jack structure comprising a support, a stationary arm projecting therefrom, a movable arm swingingly connected to said support, a jaw structure at each end of each of the arms consisting of a stationary jaw and a movable jaw, and means for releasably holding the movable arm and the movable jaws in adjusted position.

4. A jack structure comprising a support, a stationary arm projecting therefrom, a movable arm swingingly connected to said support, and a jaw structure at each end of each of the arms consisting of a stationary jaw and a movable jaw, and means associated with the movable jaws for mechanically giving relative adjustment to the arms.

5. A jack structure comprising a base, a pair of companion rack bars connected for relative movement with one rigidly secured to the base, a pair of arms having relative movement and supported by one of the rack bars, clamp devices at the ends of the arms including movable jaws, and an expander arranged between said movable jaws.

6. A jack structure comprising a base, a stationary rack bar upstanding from the base, a movable rack bar having an adjustable clamp connection with the stationary rack bar, a stationary arm projecting from the stationary rack bar, a movable arm swingingly connected to the stationary rack bar, clamp devices at the free ends of the said arms, each consisting of a stationary jaw and a movable jaw associated therewith, an expander between the clamp devices consisting of a threaded rod pivotally connected to one of the jaws, and an operating nut on the rod engaging the opposite movable jaw.

7. In a jack structure, a support, a pair of clamping arms mounted on the support for movement with respect to each other and including a pair of pivoted jaws, a threaded rod pivotally connected to one of the jaws and slidably associated with the other jaw, and a nut threaded on the rod and having a bearing engagement with one of the jaws.

8. In a jack structure, a pair of companion rack bars connected for relative adjustment, wheel spoke engaging clamps associated with one of the rack bars and each including a pair of jaws having a pivotal connection arranged at an incline, and means for releasably holding the jaws in adjusted position.

In testimony whereof we affix our signatures.

THOMAS R. BRUMFIELD.
POSIE L. HINES.